UNITED STATES PATENT OFFICE.

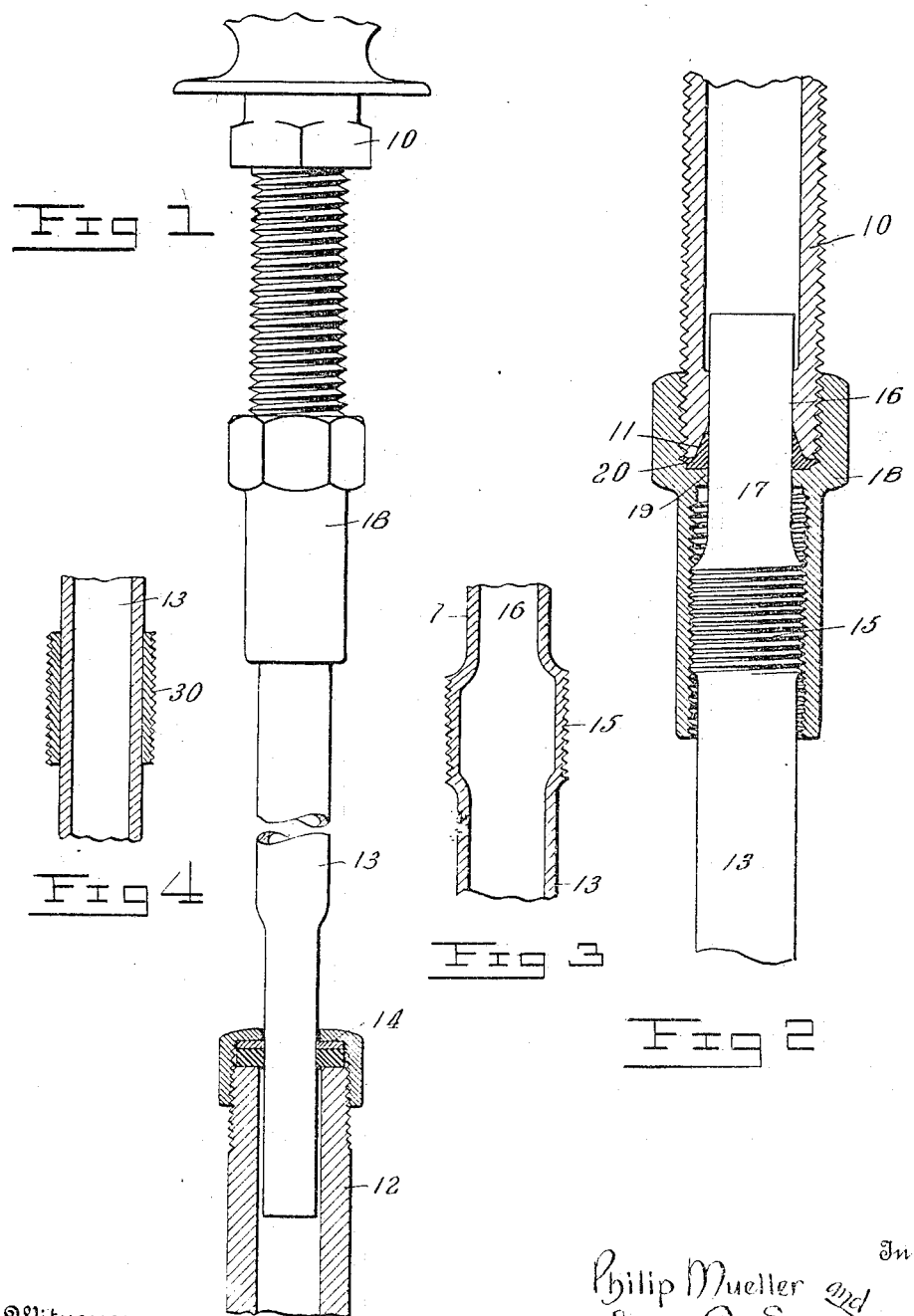

PHILIP MUELLER AND ANTON C. SCHUERMANN, OF DECATUR, ILLINOIS, ASSIGNORS TO H. MUELLER MANUFACTURING COMPANY, OF DECATUR, ILLINOIS, A CORPORATION OF ILLINOIS.

ADJUSTABLE SCREW-JOINT COUPLING FOR SUPPLY-PIPES.

1,091,692.

Specification of Letters Patent. Patented Mar. 31, 1914.

Application filed March 24, 1911. Serial No. 616,696.

*To all whom it may concern:*

Be it known that we, PHILIP MUELLER and ANTON C. SCHUERMANN, citizens of the United States, residing at Decatur, in the county of Macon and State of Illinois, have invented new and useful Improvements in Adjustable Screw-Joint Couplings for Supply-Pipes, of which the following is a specification.
This invention relates to coupling pipes such as are employed in making connection between service pipes and the faucets of bath tubs, wash basins, and the like, this connection forming what is now generally known in the art as the supply pipe, and relates more particularly to the manner in which this pipe is coupled up to the part or parts to which it is connected.

In order to permit the use of coupling pipes or the supply pipe in standard sizes as to length and diameter, especially for open plumbing work, it is found advisable to provide adjustable connections between the supply pipe and either one or both of the parts to which it is connected, this being due to the fact that the distance between the service pipe and the faucet shank, spud, or tail-piece as the case may be, varies in installation. As the supply pipe, in open plumbing work, is visible throughout substantially its length, its appearance has more or less effect upon the beauty of the plumbing, and consequently the supply pipe should be, as far as possible, symmetrical in appearance with the remaining portions of the fixtures. In view of the fact that this symmetrical appearance must be provided in the face of conditions produced by the liquid pressure, several essentials are necessary. One of the essentials required is that the coupling shall not be liable to blow-outs, and yet at the same time provide a structure in which the internal diameter of the supply should be of sufficient size for all practical purposes while the outer diameter is such as will not provide a bulky appearance. To meet these conditions, it has been proposed to employ a slip-joint connection with the end of the supply pipe telescoping into the fitting member, the supply pipe preferably having a flange against which the coupling nut may operate to retain the connection, a packing being employed in connection with this flange. This construction, owing to the liability of blow-
outs under high liquid pressure, is not entirely satisfactory, one reason being that it is difficult to provide a proper manipulation of the packing so as to insure a non-leakage of liquid. Another feature greatly desired in supply pipes, is to provide for variations in the distance between the service pipe and the faucet or lavatory member by the use of a standard length supply pipe, making the connections such as to eliminate all liability of blow-outs, one way of meeting this latter condition being to provide for a sufficient adjustment at the ends of the supply pipe to produce the proper exposed length of the pipe and yet provide a sufficient length of unexposed portion within the coupling as will make the latter practically blow-out proof. And a preferable form of device is to provide for connecting the supply and service pipes by a slip-joint, and providing for screw threaded adjustments in the connections at the opposite end of the supply pipe. To provide this arrangement we obtain the combined effect of the use of both screw threaded and slip-joint connections, obtaining the advantages of both and in addition eliminating all of the disadvantages of both. In obtaining this result we provide for compressing the packing onto a smooth face of the coupling.

The object of our invention is, therefore, to provide a coupling pipe and connections capable of providing the essentials referred to, and the invention consists in the improved construction and combination of parts hereinafter fully described, illustrated in the accompanying drawings, and particularly pointed out in the appended claims.

In the drawings, in which similar reference characters indicate similar parts in each of the views,—Figure 1 is a view partly in elevation and partly in section of a preferred form of coupling pipe mounted in position. Fig. 2 is an enlarged longitudinal sectional view taken through the connection at the upper end of the pipe. Fig. 3 is a detail sectional view of a portion of the supply pipe. Fig. 4 is a detail view showing a modified form of enlargement for the supply pipe.

In the drawings, 10 designates a faucet shank exteriorly threaded and preferably having the interior of its end flared, as at 11. This shank is illustrative only for the purpose of describing the invention, it being understood that the part represented by the shank may be a portion of any type of fitting, such as the shank of a bath or basin cock, the tail-piece of a lavatory member, etc., the invention being applicable for use in connection with any of the well known types of fittings.

12 designates the service pipe, and 13 the coupling or supply pipe, the latter preferably being formed with a reduced lower end and connected to the service pipe by a slip joint 14 of any preferred type. It is to be understood, however, that we do not limit the invention to this particular formation of the lower end of the pipe or the form of coupling, since it will be obvious that the supply pipe may have its lower end of equal diameter with the body of the pipe and that any suitable and preferred form of connection may be made between the supply and service pipes.

The principal feature of our invention is the manner in which the supply pipe is coupled to the shank 10, and a preferred form is shown in the drawings and will now be described.

The supply pipe 13, adjacent its upper end, is preferably formed with an enlarged outer diameter provided in any suitable way as by expanding the pipe, and this enlarged portion, indicated at 15, is screw threaded externally. Between the end of the pipe and the screw-threaded portion, the pipe is of reduced diameter, as indicated at 16, said reduced end having an external smooth face 17 and being of a diameter to permit it to extend loosely into, but approximately fit the interior of the shank 10 adjacent its inlet end, said reduced portion being formed in any suitable manner, preferably by the pipe being drawn to produce the result.

18 designates a coupling member having its threads preferably on two planes complemental to the threads of the shank and the enlarged portion 15, said coupling member also being formed with an internal shoulder shown in the present instance as having an inwardly extending flange 19 positioned intermediate the threaded portions, said flange having an opening of substantially equal diameter with the outer diameter of the smooth portion 17, the structure being such that said smooth portion will pass loosely through the opening in the flange 19.

As more clearly shown in Fig. 2 the coupling member 18 comprises an internally threaded nut-like head having a relatively long sleeve-like extension formed integral therewith and threaded throughout its length, the internal diameter of the said head being greater than the internal diameter of the said extension and the latter being appreciably longer than the threaded portion 15 of the supply pipe 13 whereby said pipe may be adjusted longitudinally of the coupling member for a considerable extent and this without exposing the threaded portion 15 of the supply pipe.

As will be seen, the relative arrangement of parts just described is such as to provide adjustment for variations in distance between the inlet end of the shank 10 and the outlet end of the service pipe 12. The threaded connection of the coupling member 18 and shank 10 is not primarily intended for the purpose of providing for adjustment, this connection acting to form the packing, this packing being provided by the preferable use of a suitable gasket 20 which is compressed on the smooth portion 17 by the action of the opposed faces provided by the flared end 11 of the shank and the internal shoulder within the coupling member, as shown in Fig. 2, the threading of the member 18 on to the shank causing the gasket to be compressed so as to form a liquid tight joint external of the smooth portion 17 at a point in advance of the flange 19. The adjustment is provided by the screw threaded connection of the portion 15 of the supply pipe 13, with the extension of the coupling member 18, the threads of the portion 15 being preferably a multiple of the threads of the shank 10 in order that the member 18 may have its threading movement on both members without providing a relative movement between the supply pipe and the shank, this construction permitting the supply pipe to be positioned prior to making the connection, which position will be maintained during the coupling movement of the member 18 on the shank, this coupling movement acting to compress the gasket 20 on to the smooth portion 17, this being especially advantageous for use where a connection of supply and service pipes is fixed, as, for instance, by a wipe joint. Obviously, however, the particular relationship described of the threads on the shank and the enlarged portion 15 may be other than that above described, in which case the supply pipe and shank will have a relative movement during the threading of the coupling member 18 on to the shank, unless the relative rotative threading movements of the coupling member and the supply pipe be such as would retain the shank and supply pipe against relative axial movement. By providing the relationship referred to, however, the depth of the threads on the enlarged portion is reduced and eliminates the necessity for providing an unequal wall thickness to the supply pipe at this point. The particular advantages of this construction not heretofore indicated lie in the fact that we obtain all of the advantages of the slip joint structure with respect to the gasket packing, and at the same time provide a threaded connection which positively positions the supply pipe relative to the shank, at any desired point within the limit of adjustments provided by the threads, the threaded portion acting to support the connection against blow-outs. Furthermore, the gasket packing is located in advance of the threaded connection and thereby tends to prevent the liquid from passing into the threaded connection.

As will be readily understood, the adjustable connection for the supply pipe provided by the threaded portion 15, may be employed for connecting the supply pipe with the service pipe, the parts being preferably arranged substantially as shown in Fig. 2, in which case the part indicated as 10 would represent the service pipe, providing practically a reversal of the arrangement disclosed in Fig. 1. Or, if desired, both ends of the supply pipe may be formed to provide an adjustable connection of the type shown in Fig. 2.

While we prefer to expand the supply pipe as shown in Fig. 3, this construction is not absolutely essential, since, as shown in Fig. 4, the enlargement may be provided by securing a threaded thimble 30 to the periphery of the supply pipe at the proper point, the securing being preferably by sweating the thimble onto the pipe. This form provides an equivalent for the form shown in Fig. 3, the two structures being considered as being equivalents within the scope of the claims.

While we have herein disclosed a preferred form and modifications thereof, it is to be understood that changes and modifications therein required under the conditions of use may be employed and are contemplated by the invention herein so long as they fall within the spirit and scope of the invention as disclosed in the following claims.

Having thus described our invention, what we claim as new is:—

1. In combination, an externally threaded shank having its inner wall flared at its end, a supply pipe having an enlarged threaded portion adjacent its end and being reduced outwardly of the threaded portion, the reduced outer end of the supply pipe fitting loosely in the shank, a coupling member having internal threads engaging over the enlarged portion of the supply pipe and about the shank, and further having an inwardly extending flange embracing the reduced end of the supply pipe in spaced relation from the end of the shank, and a gasket fitting in the flared end of the shank and resting against the flange, whereby the gasket is compressed against the supply pipe by the tightening of the coupling member over the gasket.

2. In a coupling, an externally threaded shank having its inner wall flaring at the end of the shank, a supply pipe extending loosely into the shank and having an enlarged threaded portion extending outwardly from the shank, a gasket engaging in the flared end of the shank about the supply pipe, and a coupling member threaded on the end of the shank and having an inwardly extending flange engaging with the gasket and binding the same in the shank and on the supply pipe, the coupling member having an internally threaded portion extending beyond the flange and engaging adjustably over the threaded and enlarged portion of the supply pipe.

3. In a coupling, an externally threaded shank having its inner wall flaring at the end of the shank, a supply-pipe extending loosely into the shank and having an enlarged threaded portion extending outwardly from the shank, a gasket engaging in the flared end of the shank about the supply pipe, and a coupling member threaded on the end of the shank and having an internal shoulder engaging with the gasket and binding the same in the shank and on the supply pipe, the coupling member having an integral threaded portion extending beyond the said shoulder, and engaging adjustably over the threaded and enlarged portion of the supply pipe.

In testimony whereof we have hereunto set our hands in presence of two subscribing witnesses.

PHILIP MUELLER.
ANTON C. SCHUERMANN.

Witnesses:
LEONARD F. MCKIBBEN,
WILLIAM R. BIDDLE.